April 8, 1969   M. ANESI   3,437,154
GARDEN TOOL
Filed March 4, 1966
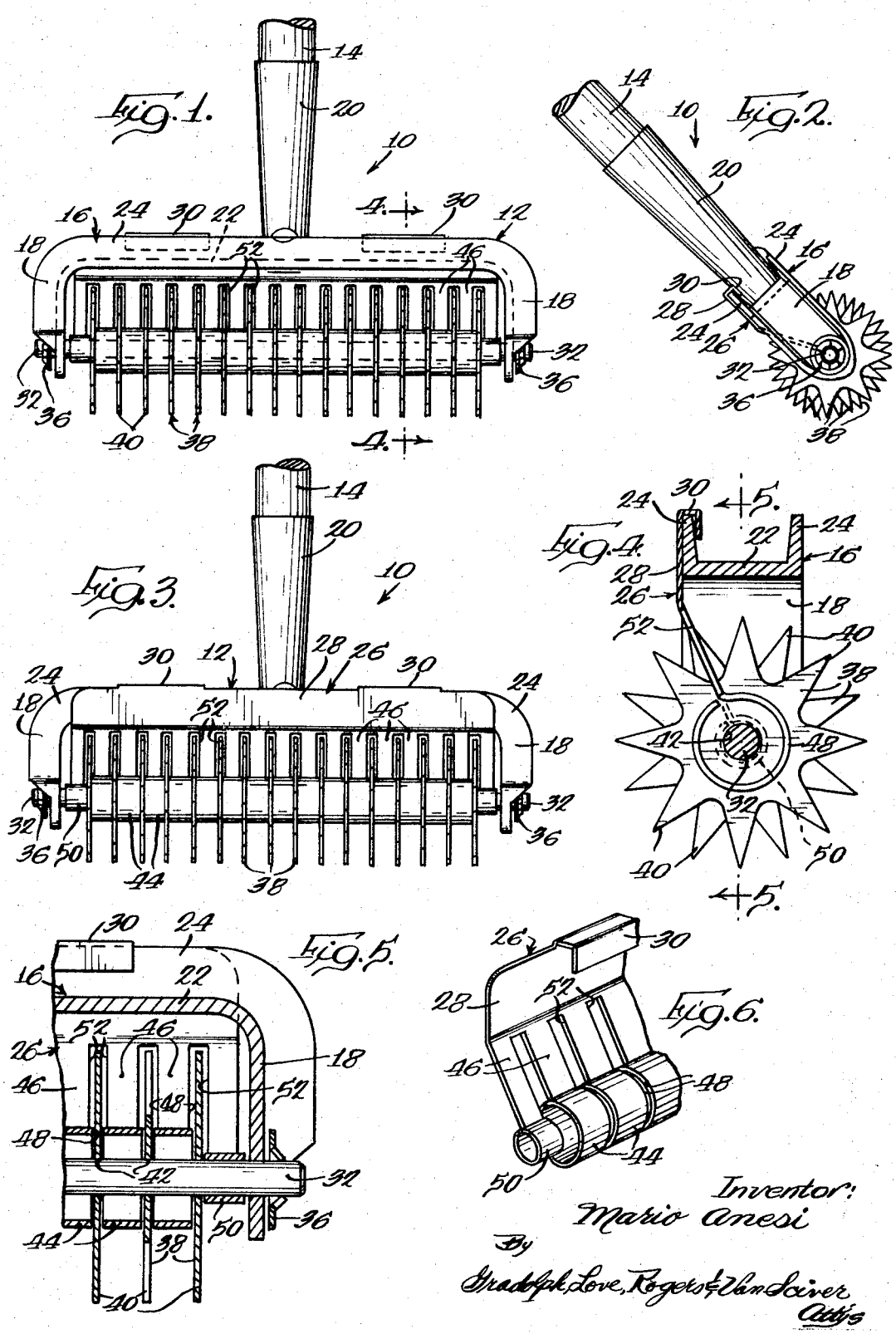
Inventor:
Mario Anesi
By
Gradolph, Love, Rogers & VanSaver
Attys 3,437,154
GARDEN TOOL
Mario Anesi, 4949 Natoma Ave., Chicago, Ill. 60631
Filed Mar. 4, 1966, Ser. No. 531,802
Int. Cl. A01b 39/00, 3/02, 3/04
U.S. Cl. 172—350    2 Claims

ABSTRACT OF THE DISCLOSURE

The said working garden tool has an inverted U-shaped frame supporting a horizontal axle between its arms. A plurality of relatively closely spaced star-shaped soil working members are freely journaled on the axle. A unitary web spacer is attached to the frame and the axle and has fingers projecting between the members and outside the end members and spaced closely thereto to act as cleaners. The fingers between the members have generally cylindrical shapes around the axle of a diameter substantially greater than that of the axle to provide stabilizing bearing surfaces to hold the members upright.

---

Small gardens and small plots of land require a manually operable tool with which to work the soil about the bases of bushes, shrubs and other small plants from a standing position. Such tool would also be useful in loosening the soil in small bare patches in a lawn or other grassy area which need reseeding and in mulching.

It is a principal object of the present invention to provide a novel tool which is useful in working the soil around and under bushes, shrubs, small plants and the like in bare patches on lawns and for mulching purposes.

Another object is to provide a novel garden tool having a frame on which are journaled individually rotatable soil working members or wheels.

Another object is to provide a novel garden tool having a spacer and cleaner for individually rotatable wheels journaled on the frame of the tool.

Another object is to provide a novel garden tool made from a plurality of similar parts which can be manufactured in quantity and assembled easily and at low cost.

Other objects and advantages will become apparent from the following description taken in conjunction with the accompanying drawings wherein:

FIG. 1 is a front elevational view of the garden tool of this invention;

FIG. 2 is a side elevational view of the garden tool;

FIG. 3 is a rear elevational view of the garden tool;

FIG. 4 is a transverse sectional view on an enlarged scale taken along the line 4—4 of FIG. 1;

FIG. 5 is a fragmentary longitudinal sectional view taken along the line 5—5 of FIG. 4; and FIG. 6 is a fragmentary perspective view of the web spacer of the invention.

The garden tool of the present invention indicated generally by the reference character 10 comprises a head 12 to which is removably secured a handle 14 which may be made of wood, aluminum, tubular steel or the like and which is approximately as long as the handle of a conventional garden rake.

The tool head 12 includes a yoke or U-shaped frame 16 cast from iron, aluminum, or aluminum alloys and formed with downwardly and forwardly extending arms 18 and a hollow boss 20 on the back or transverse part 22 of the frame. Decorative and reinforcing ribs 24 extend away from the boss 20 toward the outer ends of the frame and continue above the arms 18 as shown. The handle 14 is secured in the boss 20 by friction. This arrangement for securing the handle 14 to the head 12 is illustrative only and other means may be employed.

The outer ends of the two arms 18 are provided with coaxial holes through which project the opposite ends of an axle 32. The axle end projects beyond the outer faces of the arms 18 and adjacent these faces the axle is retained and inhibited against axial movement with friction spring finger clips 36.

Between the arms 18 is a plurality of plate-like soil working members or wheels 38 which are more clearly seen in FIG. 4. Each of these members is provided with a central aperture 42 to enable it to be journaled on the axle 32 and with a plurality, eight in this instance, of pointed tips 40 which as the garden tool 10 is moved over the soil dig into the soil to loosen it. The points 40 on the star wheel 38 are long compared with the diameter. For example, in a wheel measuring 2¼ inches from tip to tip, the depth of each point 40 is approximately 11/16 inches. This insures that the tool will work the soil to the proper depth and that it will have a very substantial loosening effect.

In the embodiment of the tool shown in the drawing there are sixteen star shaped wheels 38 which are individually mounted on the axle 32 and are rotatable relative thereto and relative to each other so that a proper working of the soil can be effected. These star wheels 38 are separated from each other and from the frame arms 18 by a web or comb 26 having a unitary head portion 28 and a pair of U-shaped grips 30 by which the web 26 is anchored to the frame 16 over one of the ribs 24.

As can be seen in FIG. 6, the web 26 has generally cylindrical spacers 44 which are rolled extensions of fingers 46. Spacers 44 are wrapped around the axle 32 between the star wheels 38 and have bearing surfaces 48. Since the diameter of the spacers 44 is two to three times that of the axle, the bearing surfaces 48 provide lateral stability for the star wheels 38 and support them upright. At each end of the web 26 is an axle aperture 50 which fits closely about the axle 32 and with the grips 30 holds the web 26 on the frame 16. The fingers 46 have surfaces 52 which are at a greater separation than the bearing surfaces 48 of the spacers 44. These fingers 46 are designed to support the spacers 44 and also clean the star wheels as they pass surfaces 52 in working the soil to remove excess soil from the wheel tips 40. Thus, the spacers 44 properly space the wheels 38 from each other and from the forwardly and downwardly extending arms 18 of the frame 16 and insure that the wheels 38 will rotate relative to each other and to the axle 32.

The tool in operation is used in the position shown in FIG. 1 with the tips 40 of the star wheels 38 engaging the ground. Inasmuch as they are individually rotatable, they may assume an indefinite number of positions relative to each other, some of which are indicated in FIGS. 2 and 4. This insures that the tool will move fairly smoothly over the ground under the pushing action of the gardener and will be pressed into the ground the necessary distance to loosen the soil and to provide a fertile area for the reception of grass seed in the case of a bare spot being reseeded, or to loosen the soil around the bases of plants, shrubs, hedges and the like so that the ground can be fertilized and watered.

It is preferred that the star wheels 38 and web 26 be suitably finished as by cadmium plating to prevent rusting. It will also be observed that it is a rather easy tool to package for shipment inasmuch as the handle 14 may be readily separated from the frame 16 and the two placed in a package side by side with the back 22 of the frame lying parallel with the long dimension of the handle 14.

Various modifications may be made in the invention without departing from the spirit and scope thereof.

What is claimed as new and desired to be secured by United States Letters Patent is:

1. In a garden tool for working the soil having a one piece U-shaped frame having downwardly and forwardly extending arms when the tool is in operative position, a horizontally disposed axle mounted in the outer and free ends of the arms, and a plurality of relatively closely spaced star-shaped plate-like soil working members journaled on the axle to rotate freely thereon and relative to each other and each having a plurality of radial projections thereon engageable in the soil, the improvement comprising a unitary plate-like spacer having a web attached to the bight of the frame with flat fingers projecting between and substantially spanning the space between the star-shaped members and to the outside of the end members, said fingers being in closely spaced relationship to the members so as to clean the latter during rotation, and said fingers projecting between the members each terminating in a portion of generally cylindrical shape around the axle of a diameter substantially greater than that of the axle and contacting adjacent star-shaped members to provide stabilizing bearing surfaces to hold the members upright.

2. In a garden tool for working the soil as recited in claim 1, wherein the generally cylindrically shaped portions of said fingers to the outside of the end members have diameters not substantially greater than that of the axle to assist in holding said web in the frame.

References Cited

UNITED STATES PATENTS

| | | | |
|---|---|---|---|
| 422,161 | 2/1890 | Ruggles | 172—558 X |
| 2,881,846 | 4/1959 | Stromberg | 172—350 X |

ABRAHAM G. STONE, *Primary Examiner.*

WALTER J. CONLON, *Assistant Examiner.*

U.S. Cl. X.R.

172—548